No. 747,892. PATENTED DEC. 22, 1903.
H. RODMAN.
SECONDARY BATTERY SEPARATOR.
APPLICATION FILED MAY 17, 1902.
NO MODEL
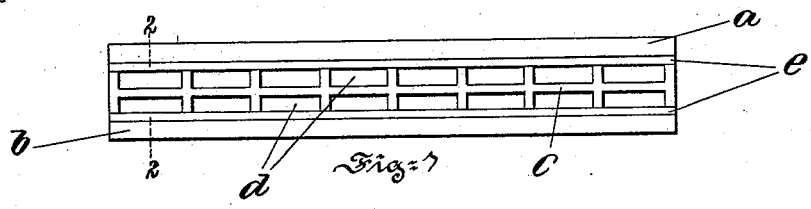
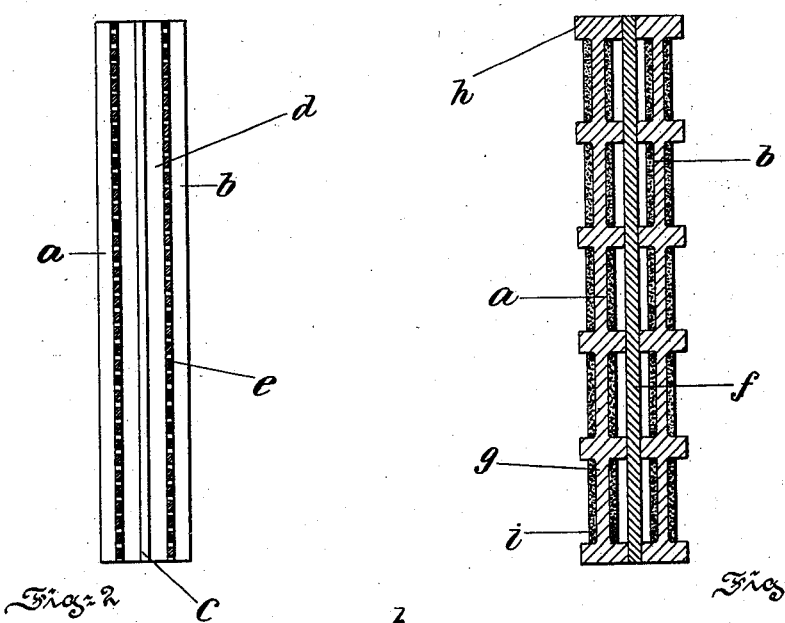
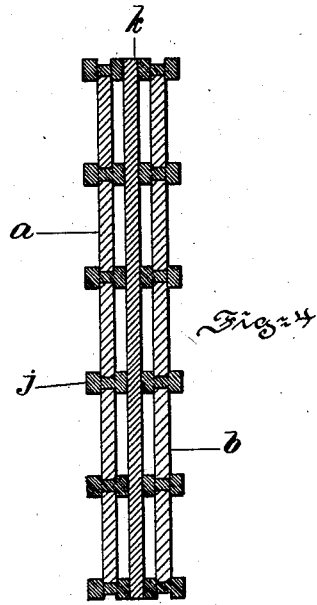

No. 747,892. Patented December 22, 1903.

UNITED STATES PATENT OFFICE.

HUGH RODMAN, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SECONDARY-BATTERY SEPARATOR.

SPECIFICATION forming part of Letters Patent No. 747,892, dated December 22, 1903.

Application filed May 17, 1902. Serial No. 107,790. (No model.)

*To all whom it may concern:*

Be it known that I, HUGH RODMAN, a citizen of the United States, residing at Philadelphia, in the county of Philadelphia and State of Pennsylvania, have invented certain new and useful Improvements in Secondary or Storage Batteries, of which the following is a specification.

The use of wooden separators in storage batteries is productive of remarkably beneficial results; but I have discovered that where the wood comes in contact with the peroxid or active material of the positive-pole plate the nascent oxygen causes deleterious rotting of the wood; and it is the object of the present invention to attain the advantages incident to the use of wooden separators and to overcome the above-mentioned disadvantage, which to a large extent has heretofore precluded their use.

Stated in general terms, the invention consists of wooden separators interposed between the plates or elements and means interposed between the positive-pole plates or elements and the separators to keep the wood from coming in contact with the active material.

The invention further comprises the improvements hereinafter described and claimed.

The nature, characteristic features, and scope of the invention will be more fully understood from the following description, taken in connection with the accompanying drawings forming part hereof, and in which—

Figure 1 is a top or plan view illustrating a positive and a negative pole plate, a wooden separator, and means for keeping the latter out of contact with the active material of the positive-pole plate. Fig. 2 is a sectional view taken on the line 2 2 of Fig. 1. Fig. 3 is an elevational view, principally in section, illustrating a modification of the invention; and Fig. 4 is a similar view illustrating another modification.

In the drawings, $a$ designates the positive and $b$ the negative pole plates.

Referring to Figs. 1 and 2, the wooden separator $c$ consists of a central imperforate sheet having ribs projecting from its opposite faces, thus forming, as it were, wells $d$ for the acid or electrolyte. Interposed between the positive-pole plate $a$ and the wooden separator $c$ is a perforated sheet of rubber $e$. This sheet constitutes means for keeping the wood away from the active material or peroxid of the positive-pole plate $a$, or, in other words, from the deleterious action of the oxygen, which becomes nascent there. Another rubber sheet is shown interposed between the wood and the negative-pole plate; but its presence or absence is not important to the present invention.

As shown in Fig. 3, the wooden separator $f$ consists of a thin sheet of wood, and the grid $g$ of the positive-pole plate is provided with projections $h$, which serve to keep the wood away from the active material or peroxid $i$ of the positive-pole plate. The fact that the negative-pole plate $b$ is shown in Fig. 3 as constructed like the positive-pole plate is immaterial to the present invention.

As shown in Fig. 4, use is made of plugs $j$, as of soft rubber or any material which is not readily acted upon, for keeping the sheet of wood $k$, which constitutes the separator, away from the face or part of the positive-pole plate $a$ where the oxygen is nascent.

The term "wooden" is intended to include such materials as paper and other cellulose fiber products.

Of course the positive-pole plates may be formed Plantewise or Brushwise, as indicated in the drawings, and the configuration of the wooden separator may be variously modified and the means employed for keeping the wooden separator away from the active portions of the positive-pole plate may be modified without departing from the spirit of the invention. Hence I do not limit myself to the precise construction and arrangement of parts hereinabove set forth, and illustrated in the accompanying drawings; but, Having thus explained my invention, what I claim as new, and desire to secure by Letters Patent, is—

1. In a secondary or storage battery the combination with the positive-pole plate or element, of a wooden imperforate separator and means for keeping the wooden separator out of contact with the active portion of the positive-pole plate, substantially as described.

2. The combination in a secondary or storage battery, of positive and negative pole elements, wooden imperforate separators located between the two, and means interposed between the positive-pole plate or element and the wood separator to keep the same from coming in contact with the active material of the positive-pole plate or element, substantially as described.

3. The combination in a secondary or storage battery, of a positive-pole element or plate, a facially-ribbed wood separator, and a perforated rubber sheet interposed between the separator and the plate or element to keep the wood from coming in contact with active material, substantially as described.

In testimony whereof I have hereunto signed my name.

HUGH RODMAN.

In presence of—
EDWARD WANTON SMITH,
BRUCE FORD.